(12) United States Patent
Baughman (10) Patent No.: US 9,311,053 B2
(45) Date of Patent: Apr. 12, 2016

(54) INTEGRATED INFORMATION EXCHANGE MANAGEMENT AND CONTROL OF DESIGN CONFIGURATIONS

(71) Applicant: The Boeing Company, Chicago, IL (US)

(72) Inventor: Jason Ryan Baughman, Lakewood, CA (US)

(73) Assignee: THE BOEING COMPANY, Chicago, IL (US)

( * ) Notice: Subject to any disclaimer, the term of this patent is extended or adjusted under 35 U.S.C. 154(b) by 92 days.

(21) Appl. No.: 14/265,362

(22) Filed: Apr. 30, 2014

(65) Prior Publication Data

US 2015/0317128 A1   Nov. 5, 2015

(51) Int. Cl.
| | | |
|---|---|---|
| *G06F 17/30* | (2006.01) | |
| *G06F 7/00* | (2006.01) | |
| *G06F 9/44* | (2006.01) | |
| *G06Q 10/10* | (2012.01) | |

(52) U.S. Cl.
CPC ............ *G06F 8/20* (2013.01); *G06F 17/30294* (2013.01); *G06F 17/30289* (2013.01); *G06Q 10/10* (2013.01)

(58) Field of Classification Search
USPC ........................................................ 707/790
See application file for complete search history.

(56) References Cited

U.S. PATENT DOCUMENTS

| | | | |
|---|---|---|---|
| 7,506,302 B2 | 3/2009 | Bahrami | |
| 7,548,802 B2 | 6/2009 | Avery et al. | |
| 7,552,203 B2 | 6/2009 | Giles et al. | |
| 7,689,329 B2 | 3/2010 | Avery et al. | |
| 7,761,200 B2 | 7/2010 | Avery et al. | |
| 7,761,201 B2 | 7/2010 | Avery et al. | |
| 8,036,955 B2 | 10/2011 | Avery et al. | |
| 8,209,300 B2 | 6/2012 | Malkowicz et al. | |
| 8,229,791 B2 | 7/2012 | Bradley et al. | |
| 8,285,777 B2 | 10/2012 | Giles et al. | |
| 8,296,197 B2 | 10/2012 | Avery et al. | |
| 8,401,726 B2 | 3/2013 | Bouvier et al. | |
| 8,423,430 B2 | 4/2013 | Avery et al. | |
| 8,645,148 B2 | 2/2014 | Small et al. | |
| 8,712,818 B2 | 4/2014 | Giles et al. | |
| 2012/0036552 A1* | 2/2012 | Dare | H04L 41/0253 726/1 |
| 2012/0291011 A1* | 11/2012 | Quine | G06F 9/45512 717/115 |
| 2012/0330454 A1 | 12/2012 | Giles et al. | |
| 2014/0304505 A1* | 10/2014 | Dawson | G06F 21/6227 713/165 |

* cited by examiner

*Primary Examiner* — Kuen Lu
(74) *Attorney, Agent, or Firm* — Yee & Associates, P.C.

(57) ABSTRACT

An apparatus for managing data exchange between tools for multiple products in a product line is provided. The apparatus includes an application launcher configured to create a workspace to support a plurality of applications. The apparatus also includes an application manager configured to execute as a web service and load a first data and a second data associated with a first application and a second application, respectively, into the workspace. The apparatus also includes a concurrent engineering data service configured to capture data types associated with the first data and the second data and resolve differences in the data types wherein the data types comprise at least strings, doubles, and integers. The apparatus also includes a data storage and retrieval service configured to enforce integrity of and access rules associated with the first data and the second data.

20 Claims, 8 Drawing Sheets

INTEGRATED INFORMATION EXCHANGE MANAGEMENT AND CONTROL OF DESIGN CONFIGURATIONS

BACKGROUND INFORMATION

1. Field

The present disclosure relates generally to the exchange of information between disparate information technology systems and, in particular, to providing a web service for applications with unlike data structures, storage requirements, and user interface media to interoperate and share data in a protected user workspace.

2. Background

In many large organizations, heavily accessed applications may originate from a variety of sources including commercial off-the-shelf (COTS), proprietary applications created for specific functions within the organization, and applications written in-house that may be little more than ad hoc software utilities. Such applications may be accessed in conjunction with information about numerous products in a product line, such as, for example, a line of commercial jet aircraft. Applications may evolve over time with their code bases and interfaces changing with each successive release and patch update. Customized software applications, originally created as in-house utilities to address specific problems, may begin as simple tools and grow in popularity while taking on further functionality and complexity over time. Such customized applications that are used exclusively in-house may not be subject to the level of quality control and version control procedures ordinarily used if released commercially or otherwise provided to external customers or partners.

An engineer may use a web browser to access a commercial off-the-shelf application and, at the same time, may use more traditional desktop client software to access a server-based application via traditional client desktop software. The engineer may wish to exchange data between the two disparate applications as well as import data from other and different applications. The exchange and management of technical and product information between software systems is a continuing challenge in engineering, product development, and other professional environments. Data used in these computing environments may be captured in many disparate systems, each with its own data model, data format, storage structure, configuration controls, and unique interface requirements. Information from one system or tool may not be readily transportable to another. Data may have to be translated several times between different users. Data may need to be reorganized or modified by a user before being made available to an application.

When attempting to manage data between disparate applications and tools, sending notifications of changes to only interested parties while bypassing disinterested may present challenges. Additional challenges may be presented by the need to launch dependent applications and independent workspaces, as well as the need to relate product specific assets to general assets of product lines. When multiple product data is managed in a single product line information management system, challenges may also be presented by functional areas using different representations, interfaces, configuration controls, and tools.

Challenges of disparate data integration may be further complicated by the dynamic nature of technical information and the continuous need to change, add, or otherwise disturb the structure of information. Because of the dynamic nature of this information, some integrations may become stagnant and unused within a short time. Further, challenges may arise for configuration management in traditional systems that rely on explicit schemas or interactive management of each element of a set. Accordingly, it would be advantageous to have a method and apparatus which takes into account one or more of the issues discussed above as well as possibly other issues.

SUMMARY

The illustrative embodiments provide for an apparatus for managing data exchange between tools for multiple products in a product line. The apparatus includes an application launcher configured to create a workspace to support a plurality of applications. The apparatus also includes an application manager configured to execute as a web service and load a first data and a second data associated with a first application and a second application, respectively, into the workspace. The apparatus also includes a concurrent engineering data service configured to capture data types associated with the first data and the second data and resolve differences in the data types wherein the data types comprise at least strings, doubles, and integers. The apparatus also includes a data storage and retrieval service configured to enforce integrity of and access rules associated with the first data and the second data.

The illustrative embodiments also provide for a method of managing data exchange between tools for multiple products in a product line. The method includes a computer executing an application launcher, the application loader creating a workspace to support a plurality of applications. The method also includes the computer executing an application manager, the application manager executing as a web service and loading a first data and a second data associated with a first application and a second application, respectively, into the workspace. The method also includes the computer executing a concurrent data service, the concurrent data service capturing data types associated with the first data and the second data and resolving differences in the data types wherein the data types comprise at least strings, doubles, and integers. The method also includes the computer executing a data storage and retrieval service, the data storage and retrieval service enforcing integrity of and access rules associated with the first data and the second data.

The illustrative embodiments also include a method of managing data exchange between tools for multiple products in a product line. The method includes a computer providing a real time interface between disparate applications in a multidisciplinary design, analysis, and optimization (MDAO) framework. The method also includes the computer providing a concurrent data service, the concurrent data service creating a workspace for hosting the real time interface and resolving structural differences between data types associated with data provided by the disparate applications wherein the data types comprise at least strings, doubles, and integers. The method also includes the computer, based on having resolved differences between the data types, sharing the data between the disparate applications, promoting processing of shared data by the disparate applications, and storing processed data.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments provide methods, techniques, and software designed to permit the exchange of information using common, reusable elements. Management of information is enabled in the form of individually controlled elements. Such elements may be consumed or derived from files or from discretely shared or requested data blocks.

The illustrative embodiments provide an application launcher to start applications and work in private workspaces that may be specific to a product. In an embodiment, an engineer or product developer working for an aircraft development and manufacturing environment may be assigned to work on a new aircraft model, and may perform work in a private and segregated computing and development workspace. The illustrative embodiments provide helper applications to transform data between disparate enterprise applications and tools frequently used by such engineers and developers. After performing operations in the segregated workspace, the helper applications then publish results of the operations back to the enterprise applications.

The illustrative embodiments provide for certain applications to subscribe to a web service in a service-oriented architecture. Subscribing applications may include commercial off-the-shelf (COTS) applications, proprietary in-house applications, in-house utilities or tools, and other software. Subscribing applications may be used by engineers, product designers, or others in performing their job responsibilities.

The web service provided by the illustrative embodiments allows subscribing applications to selectively publish their data to the web service. Subscribing applications may be disparate from each other in terms of data structure, storage methods, and user interface media. The illustrative embodiments allow certain authorized users to access the subscribing applications from their client machines. The authorized users may need to access a certain combination of the subscribing applications wherein the certain combination includes subscribing applications which are disparate from each other for a variety of technical and usability reasons. Users may need to have two or more disparate applications to share data with each other.

The illustrative embodiments provide for creation of a private or segregated workspace for the requesting user. The workspace may be created on the user's computer or elsewhere, such as on an enterprise server. The workspace may be dedicated to the user working with the selected combination of subscribing applications and sharing data between them. The user is able to access data from the subscribing applications that the subscribing applications have published to the web service. When the user is finished with working on the various selected subscribing applications, data that has been shared may be published back to the subscribing applications. The session associated with the workspace may be terminated and the workspace may be deleted.

The illustrative embodiments provide for overcoming disparities between subscribing applications by reducing items of data down to a basic data type, such as, for example, string, double, and integer data types, and resolving differences at that level. In addition, serialization may be used, such that data structures or object state are translated into formats that may be stored and subsequently reconstructed in the same or different computing environment.

The illustrative embodiments provide for subscribing applications to be launched and managed with a prescribed configuration of startup data that may match a particular product on which an engineer is working, such as, for example, a model of a commercial aircraft. Plug-in integrations may be added such that any new application or tool may become part of the group of subscribing applications.

Activity associated with and has access to subscribing applications may be manageable by a particular model of aircraft or other product or project to which an engineer may be assigned. The illustrative embodiments provide a means to control data that is specific to a particular product in the presence of common data across a group of products. A view of core assets within particular products may be provided with indicators of components that are common with other products and indicators of components that differ. A means to represent common and variant parts of a product line with metadata is available wherein the tools provided by the illustrative embodiments may be managed using the metadata.

The illustrative embodiments may have several technical effects that go beyond the normal physical interaction between a typical program and a computer. Specifically, the illustrative embodiments solve technical problems using technical means. The illustrative embodiments may achieve technical effects, achieve technical interations, or effect technical adaptations.

For example, by providing a technical mechanism to integrate disparate custom programs, the illustrative embodiments allow a computer to operate faster, or even to operate at all, when attempting to manipulate disparate custom programs simultaneously or in sequence. The illustrative embodiments may reduce memory access time by using a workspace branch that allows independent work to occur before checking into a baseline configuration, and by comparing and merging multiple product assets into a single combined configuration. The illustrative embodiments may speed operation of a processor by providing a generic application launcher to launch applications and work in private, specific workspaces. The illustrative embodiments may further speed operation of a processor by providing helper applications to transform data between applications, and publish those results to any subscribing application. The illustrative embodiments may further conserve processor resources by accessing or using only licenses from needed applications, rather than all applications in a multidisciplinary analysis and optimization software suite.

Figure 1:
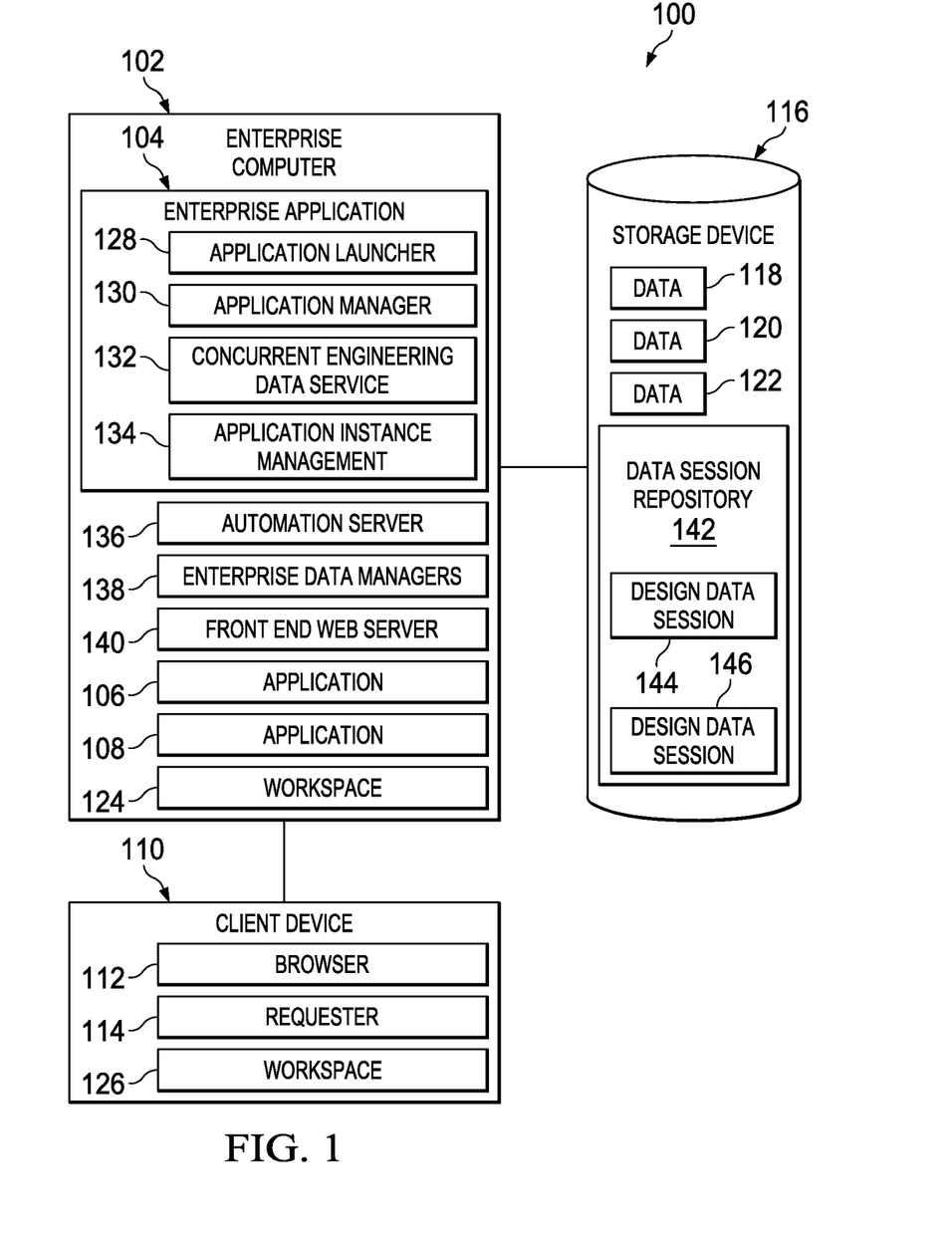
FIG. 1 is a block diagram of an apparatus for managing data exchange between tools for multiple products in a product line in accordance with an illustrative embodiment.

Attention is now turned to the figures. FIG. 1 is a block diagram of an apparatus for managing data exchange between tools for multiple products in a product line in accordance with an illustrative embodiment.

System 100 may include enterprise computer 102. Enterprise computer 102 is a data processing system. Data processing systems are described in detail hereinafter, such as with respect to FIG. 8. System 100 also includes enterprise application 104. Enterprise application 104 executes on enterprise computer 102. In an embodiment, portions of enterprise application 104 may not execute on enterprise computer 102 and may instead execute on another device, such as an enterprise server.

Enterprise application 104 may be provided at least partially as a web service in a service oriented architecture environment. Enterprise application 104 may provide interfaces that may be described in a machine-processable format that may be provided by the web services description language (WSDL), an interface description language based on extensible markup language (XML).

System 100 may also include application 106 and application 108 that may be accessed by client device 110 associated with system 100. Application 106 and application 108 may be executed at least partially by enterprise application 104. Instances of application 106 and application 108 may be simultaneously and separately executed by hardware and software components separate from enterprise computer 102 and enterprise application 104. In an embodiment, while application 106 and application 108 are depicted in FIG. 1 as components of enterprise computer 102, application 106 and application 108 may not execute fully on enterprise computer 102 and may instead execute at least partially on other devices, such as on an enterprise server.

Application 106 and application 108 may be a commercial off-the-shelf (COTS) application purchased by an entity that operates system 100. Application 106 and application 108 may be client/server applications wherein a server component executes at least partially on enterprise computer 102 and a client or requester component executes on client device 110. Application 108 may not be a commercial off-the-shelf (COTS) application and may instead be an application created by the entity for in-house use. Application 108 may be a fully supported and tested in-house application similar to commercial off-the-shelf (COTS) applications, or application 108 may be little more than an untested tool or utility with very limited application and a narrow user base that users access at their own risk. Further, application 106 and application 108 may be neither commercial off-the-shelf (COTS) applications nor in-house created applications and, in an embodiment, may instead be other types of applications and may originate from sources other than commercial software providers or in-house creators of software.

Client device 110 is a data processing system that requests access to application 106 and application 108. Client device 110 may be a desktop computer. Client device 110 may also be a laptop computer, a tablet computer, or other portable device including mobile telephone or personal digital assistant (PDA).

Client device 110 may function as a traditional client in a client/server architecture when accessing at least one of application 106 and application 108 from enterprise computer 102 and/or other servers and devices (not shown). Client device 110 may make requests of services and data provided by application 106 and application 108 by executing requester 114 that is stored and executes at least partially on client device 110. Client device 110 may in addition, or alternatively, contact enterprise computer 102 and access at least one of application 106 and application 108 via browser 112 executing on client device 110. Client device 110 may access application 106 and application 108 by other means than executing requester 114 or executing browser 112. While FIG. 1 depicts only one client device 110, in an embodiment, system 100 includes a plurality of client devices 110.

Requester 114 may be a plug-in extension of at least one of application 106 and application 108. Requester 114 may access at least one application programming interface and may create wrappers as needed for requester 114. Requester 114 may be used for utilities stored on a server that do not use the internet protocol (IP) and for which web browsing does not apply. Requester 114 may effectively inform an application launcher component that an instance of at least one of application 106 and application 108 is needed and an application launcher component may create at least one workspace for such instantiation.

System 100 also may include at least one of storage device 116 that is accessed by enterprise computer 102 and enterprise application 104. In an embodiment, storage device 116 is non-transitory computer readable storage medium storing a relational database or other type of database. Storage device 116 stores data including data 118, data 120, and data 122. In an embodiment, each of data 118, data 120, and data 122 may be specific to one of application 106 and application 108. In an embodiment, each of data 118, data 120, and data 122 may not be specific to one of application 106 and application 108 and may instead be accessed by either or both of application 106 and application 108 at separate times or simultaneously. In an embodiment, each of data 118, data 120, and data 122 may be accessed by other applications and other hardware and software components unrelated to the illustrative embodiments.

Application 106 and application 108 selectively provide at least one of data 118, data 120, and data 122 under a subscription arrangement with enterprise application 104. As subscribing applications, application 106 and application 108 make data 118, data 120, and data 122 available to enterprise application 104 for operation in segregated or protected areas or workspaces. Operating in segregated or protected areas or workspaces may increase processor efficiency, and create faster computer response times, by allowing the computer to access a limited number of workspaces instead of processes that would have required additional workspaces. Application 106 and application 108 effectively make available or publish at least one of data 118, data 120, and data 122 to enterprise application 104 for sharing and processing as described herein.

System 100 also includes workspace 124 located on enterprise computer 102 and workspace 126 located on client device 110. Workspace 124 and workspace 126 are segregated areas where at least one of data 118, data 120, and data 122 are copied by enterprise application 104. Enterprise application 104 may cause application 106 and application 108 to share and perform processing on at least one of data 118, data 120, and data 122 in at least one of workspace 124 and workspace 126. Operations are performed on at least one of data 118, data 120, and data 122 in at least one of workspace 124 and workspace 126. Results of the operations may only be committed back to application 106 and application 108 under their subscription arrangement with enterprise application 104.

In an embodiment, enterprise application 104 may copy at least one of data 118, data 120, and data 122 to workspace 124 on enterprise computer 102 for sharing and processing there. In an embodiment, enterprise application 104 may copy at least one of data 118, data 120, and data 122 to workspace 126 on client device 110 for sharing and processing there. In an embodiment, enterprise application 104 may copy at least one of data 118, data 120, and data 122 partially to workspace 124 and partially to workspace 126. In an embodiment, enterprise application 104 may copy at least one of data 118, data 120, and data 122 to a workspace created on another device.

In an embodiment, workspace 124 and workspace 126 are not permanent and may not survive a current session requested by client device 110. Once enterprise application 104 ends a session, perhaps by action initiated by client device 110, workspace 124 and/or workspace 126 may be deleted. Changes to at least one of data 118, data 120, and data 122 may then be committed back to storage device 116 on behalf of application 106 and/or application 108.

Enterprise application 104 includes application launcher 128 that launches at least one of application 106 and application 108 upon receiving a request from client device 110 or upon occurrence of another event. Application launcher 128 also allows creation and management of workspace 124 and workspace 126 and can launch any executable file on client device 110 or via execution of a uniform resource locator (URL). Application launcher 128 allows managed instances of application 106 and application 108 in a context of a specific data set.

Application launcher 128 may automatically load, configure, and manage files associated with data 118, data 120, and data 122 used to execute application 106 and/or application 108. Application launcher 128 may provide a framework for sending and receiving data 118, data 120, and data 122.

Definitions for files to be downloaded or uploaded may be captured from configurations of application 106 and application 108. Use of application 106 and application 108 may be configured to reflect specific steps in a process to enable progress tracking. Application launcher 128 may provide a common wrapper that is used regardless of location of application 106 and application 108. Client device 110 or another component may transmit a call to application launcher 128. In response, application launcher 128 may locate and launche at least one of application 106 and application 108 into at least one of workspace 124 and workspace 126.

Enterprise application 104 also may include application manager 130, a web service that manages instances of application 106 and application 108. Application manager 130 may ensure completion of pre-process and post-process instructions to improve the integrity of data 118, data 120, and data 122.

Application manager 130 may provide instructions to application launcher 128 for execution of application 106 and application 108 on client device 110. Application manager 130 may provide mechanisms for storage and retrieval of application definitions. Such application definitions may include pre-processing and post-processing definitions, data retrieval and storage definitions, and may process execution definitions.

Enterprise application 104 also may include concurrent engineering data service 132, which may provide a generic item container that can capture a variety of data types and represent any discretely managed item of information. Concurrent engineering data service 132 may encapsulate metadata to provide contextual information about each element. Concurrent engineering data service 132 may ensure ownership and rights management on managed data and may provides mechanisms for locking and archival of discrete data.

Concurrent engineering data service 132 additionally may manage unique configurations of data discretely without confounding of information because of incomplete or undefined where-used relationships. Concurrent engineering data service 132 may provide mechanisms for collective access restrictions and further may provide mechanisms for collective lock and lifecycle controls of configuration data.

Concurrent engineering data service 132 may manage collections of configuration information to allow search and retrieval of appropriate data 118, data 120, data 122. Concurrent engineering data service 132 may provide triggers based on occurrences of specified events at a discrete data level. Concurrent engineering data service 132 may utilize scripting-based action processing to allow user level definition of event handlers.

Concurrent engineering data service 132 may enable access to internal file structures from within tools integrated into enterprise application 104. Concurrent engineering data service 132 may provide mechanisms for decomposition of various file types into discretely managed pieces of information.

Enterprise application 104 also may include application instance management 134 which may provide communication channels between application launcher 128 and application manager 130, in part, for request of pre-process script execution. Application instance management 134 may provide communication channels between application launcher 128 and application manager 130 for request and transmittal of execution instructions for application launcher 128. Application instance management 134 similarly may provide such communication channels for transmittal of requests and user responses between application launcher 128 and application manager 130.

Enterprise application 104 also may include data storage and retrieval functionality which includes enforcement of data integrity and secure access rules. Data storage and retrieval functionality also may provide persistent storage of data 118, data 120, data 122 and access for the web service of enterprise application 104.

Enterprise application 104 may provide plug-in capability for direct integrations. For spreadsheet applications, enterprise application 104 may provide a plug-in for dedicated send and receive functionality that may be native inside the spreadsheet applications. Enterprise application 104 may provide custom tools to enable linking spreadsheets to data services provided by enterprise application 104.

Enterprise application 104 also may provide a data service controller that includes tools for performing configuration management functions. The data service controller may be separate from enterprise application 104.

Enterprise application 104 also may provide multi-layered security. Multi-layered security may include service level control, session/configuration level control, tool level control, and data item level control.

Enterprise application 104 may include additional functionality not represented by components in FIG. 1. Enterprise application 104 may provide service level control which includes web services-based authorization for integration with Active Directory and other credentialing systems. Web services-based authorization may be used to allow or deny rights to connect with web services. Service level control may provide user-based authorization for full administrative permissions. Further, service level control may provide session administration for user-based authorization for session permissions. Service level control also may provide session administration further allowing creation of new sessions and allowing management of existing sessions for which a user is performing an administrative function.

Session/configuration level control may provide user-based authorization for session administrator permissions and may allow a session administrator to manage a specific session data set. User access provided by session/configuration level control may provide user access controls of visibility of sessions and metadata.

Tool level control may be configurable to prescribed roles, wherein users are assigned to roles. Data item level control may accommodate tool-based information ownership. Data item level control also may allow shared responsibility across different users without explicit handoff.

Enterprise application 104 may provide communication channels between application launcher 128 and application manager 130 for transmittal of requests and responses for information retrieval and storage. Enterprise application 104 may provide a secure connection between web service information providers and persistent data storage components including storage device 116. Enterprise application 104 further may provide connectivity between application launcher 128 and end user software, such as for example, browser 112 and requester 114 executing on client device 110, for communication of application state.

Concurrent engineering data service 132 may capture data types associated with a first data and a second data and may resolve differences between the first data and the second data. Data types may include strings, doubles, and integers, or other data types. Concurrent engineering data service 132 also may also cause application 106 to process at least one of data 118, data 120, data 122 provided by application 108 and may cause application 108 to process at least one of data 118, data 120, data 122 provided by application 106.

Concurrent engineering data service 132 further may be configured to manage product line engineering data across multiple products, such as, for example, a product line of commercial jet aircraft or components of commercial jet aircraft. Application launcher 128 further may be configured to launch application 106 and application 108 with prescribed configurations for each of application 106 and application 108 matching particular products associated with each of application 106 and application 108.

Application manager 130 further may be configured to execute a plug-in integration enabling a third application (not shown) to share its own data with data 118, data 120, and data 122 in at least one of workspace 124 and workspace 126. Concurrent engineering data service 132 further may configured to provide configurations specific to products from a common set of product line assets.

Enterprise application 104 may encapsulate metadata to provide contextual parameters about each item of data 118, data 120, and data 122 provided by application 106 and application 108. Enterprise application 104 may ensure ownership and rights management on management data and may provide a mechanism for collective lock and lifecycle controls of configuration data. Enterprise application 104 may activate responses to triggers based on occurrences of predetermined events at a discrete data level. Concurrent engineering data service 132 may be provided as a web service in a service oriented environment.

The illustrative embodiments enable notifications of changes to objects within particular tools to other tools. The illustrative embodiments may provide helper applications and tools to transform between data 118, data 120, and data 122 between application 106 and application 108. Use of workspace 124 and workspace 126 may permit independent work to occur before results may be checked into baseline configurations. In this manner, a processor may operate more efficiently. Product specific configurations may be provided that may be constructed from general product line core assets. The illustrative embodiments further may provide means to compare and merge multiple product assets into a single combined configuration.

Configuration control may be performed. Reports may be run and saved. Notifications may be distributed to various recipients upon changes to data 118, data 120, and data 122. Reports and notifications may be linked with event-based systems so that based on the occurrence of various events, specified notifications are generated and sent.

The illustrative embodiments provide means to compare and merge product specific assets into a common single set of assets with managed variation. A view of an entire product line and all particular products and all particular integrated configurations is also provided. Thus, the illustrative embodiments may improve operation of a physical display device.

The illustrative embodiments may provide views of core assets within each product of a product line with indicators of common and variant parts. The illustrative embodiments may provide views of application 106 and application 108 and tools that are supported by the components of enterprise application 104.

Further, the illustrative embodiments may provide visibility of variation mechanisms and where they exist as related to core assets. The illustrative embodiments also may provide centralized feature control of variations and also may provide views of where features exist in each product. Overall product line configuration control may be made accessible.

The illustrative embodiments may provide means to represent common and variant parts of a product line with metadata and manage tools with that metadata. The illustrative embodiments further may provide means to analyze and create more common data and parts via product analysis and provide for reduction of a number of core assets to the smallest sized system. The illustrative embodiments provide may means to pass configuration data and variation control data to any tool or application 106 and application 108.

System 100 also may include automation server 136 that may execute on enterprise computer 102 and may be a multidisciplinary analysis and optimization (MDAO) software automation server that provides applications that use the multidisciplinary analysis and optimization software framework. Automation server 136 may support Model as a Service (MaaS), a solution that may support designing, mapping, integrating, and publishing open data.

System 100 also may include enterprise data managers 138 that may execute on enterprise computer 102. Enterprise data managers 138 may include enterprise product lifecycle management (PLM) servers and product data management (PDM) servers. Enterprise data managers 138 may also include computer-aided design (CAD) servers and computer-aided design (CAD) service providers as well as visualization services.

System 100 also may include front end web server 140 that may execute on enterprise computer 102 and may handle content management and document management tasks. Front end web server 140 may also provide collaboration, business intelligence, system integration, process integration, and workflow automation capabilities.

System 100 also may include data session repository 142 that may be situated in storage device 116 or elsewhere. Data session repository 142 be a non-transitory computer readable storage medium that may store design data session 144 and design data session 146 that may be instances of at least one of data 118, data 120, and data 122 created and stored resulting from at least one use of application 106 and application 108. Each time one of application 106 and application 108 and data 118, data 120, and data 122 is copied to at least one of workspace 124 and workspace 126 and receive processing, such instances may be created and may be stored in at least one of design data session 144 and design data session 146.

Figure 2:
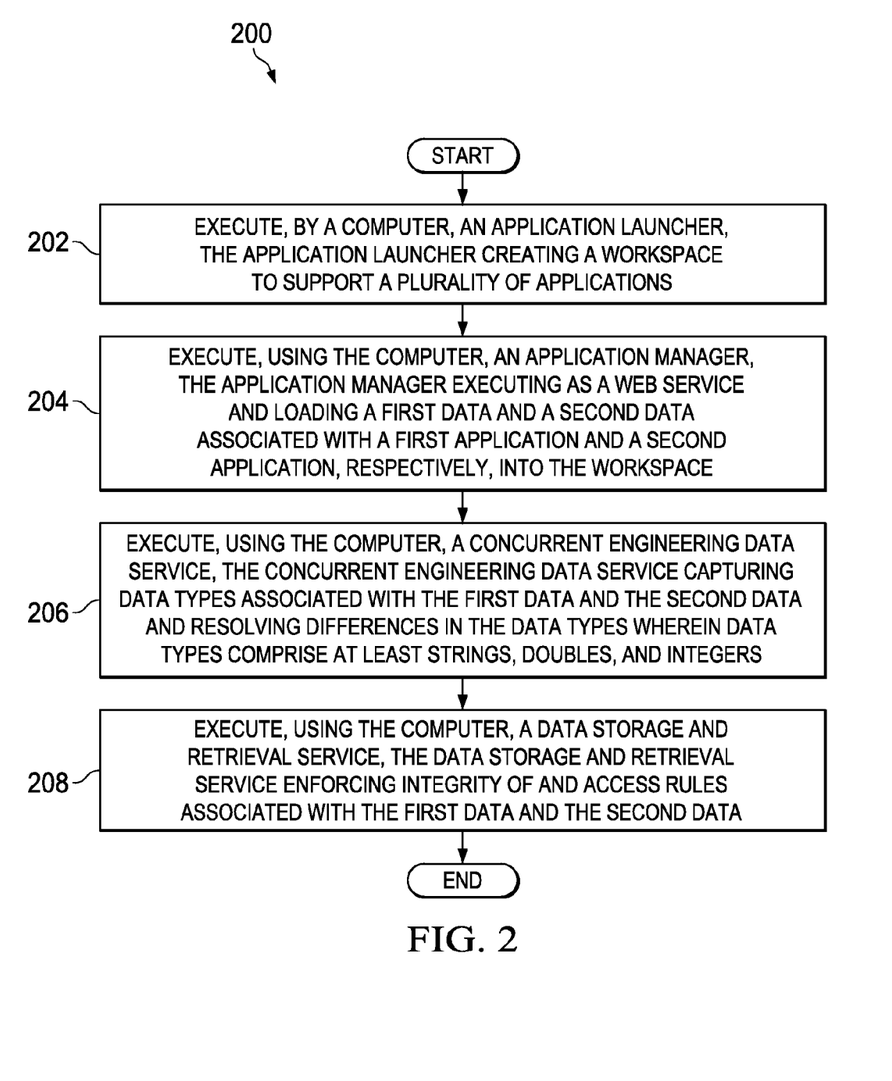
FIG. 2 is a flowchart of a method of managing data exchange between tools for multiple products in a product line in accordance with an illustrative embodiment.

FIG. 2 is a flowchart of a method of managing data exchange between tools for multiple products in a product line in accordance with an illustrative embodiment. Method 200 may be implemented using components provided by system 100 of FIG. 1.

Figure 7:
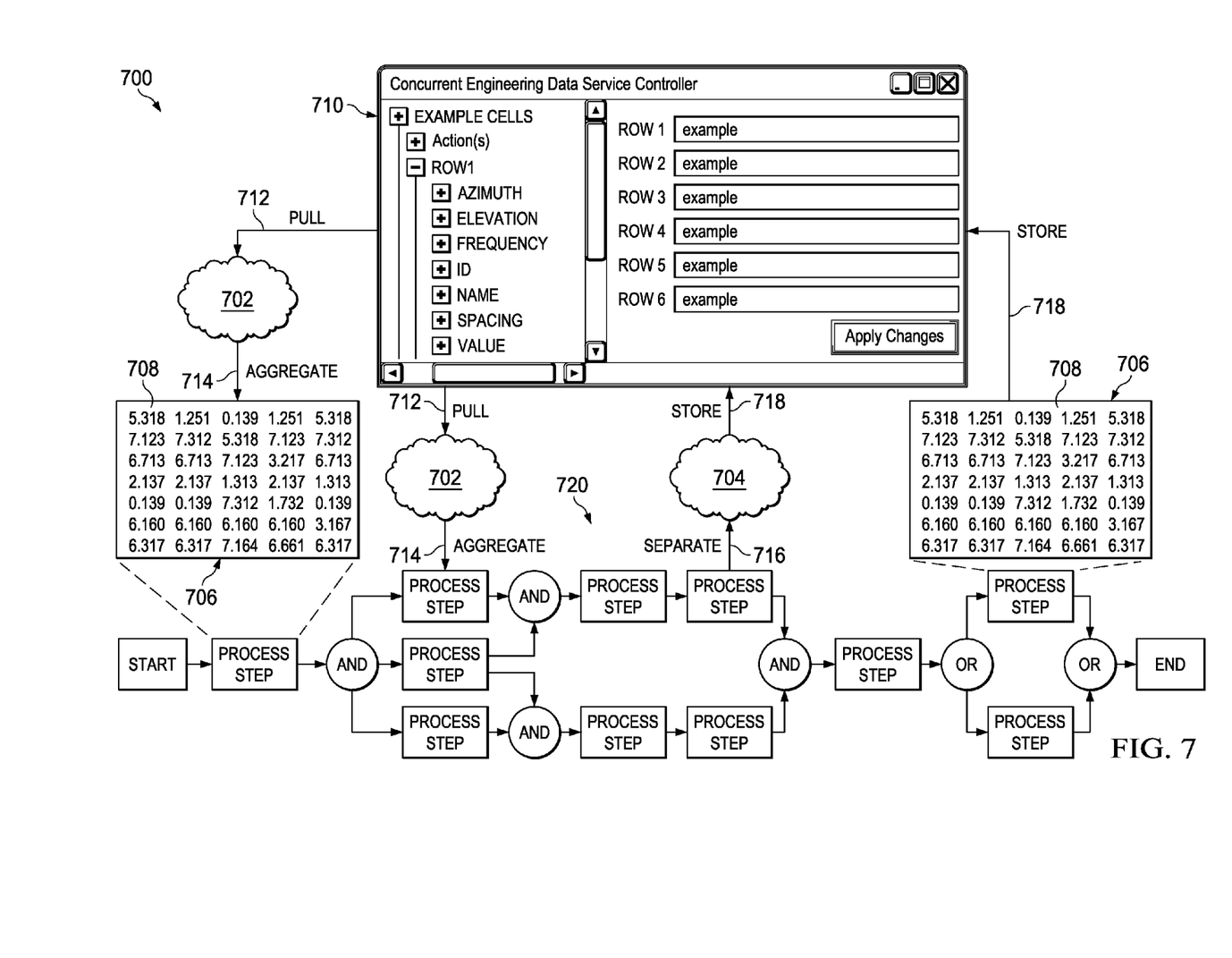
FIG. 7 is a diagram of a workflow of managing data exchange between tools for multiple products in a product line in accordance with an illustrative embodiment.
Figure 8:
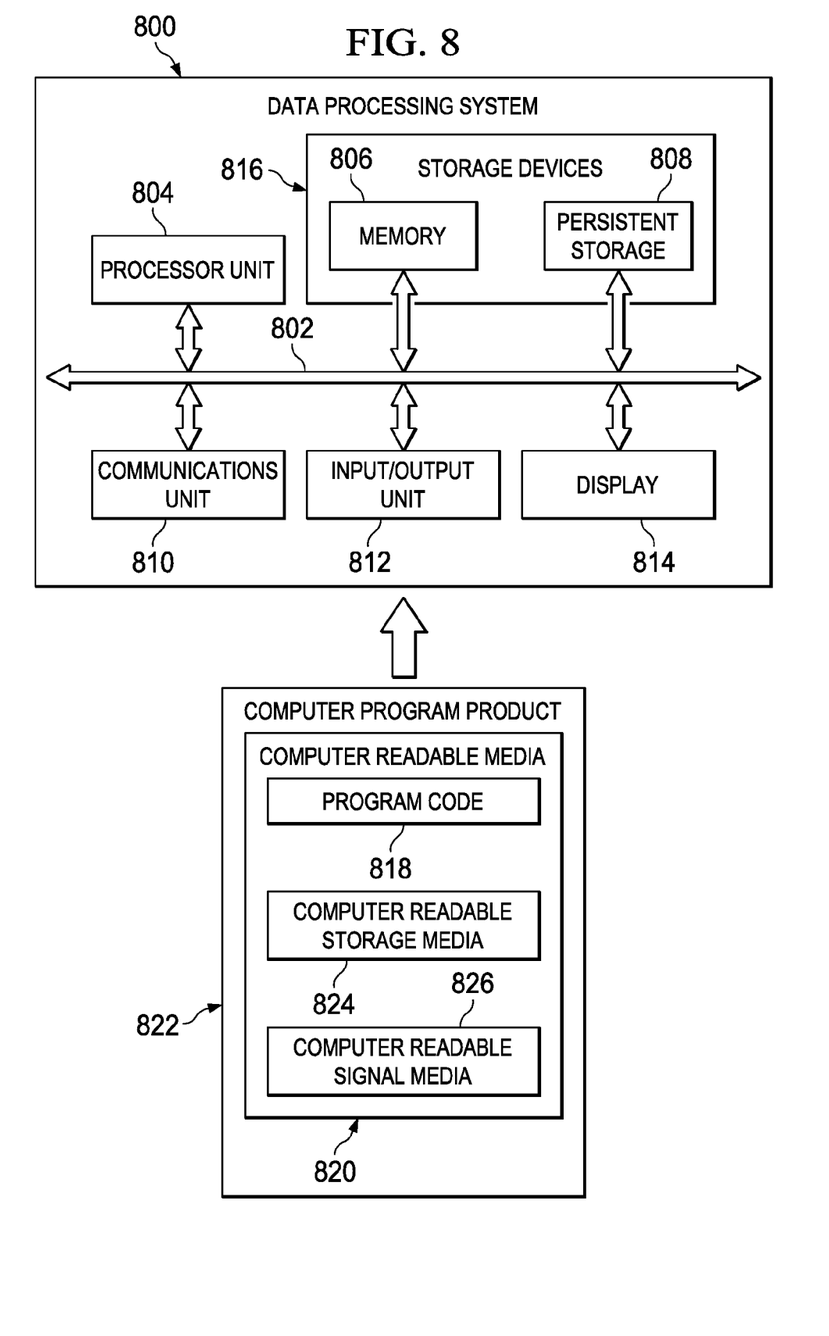
FIG. 8 is an illustration of a data processing system, in accordance with an illustrative embodiment.

The process shown in FIG. 2 may be implemented by a processor, such as processor unit 804 of FIG. 8. The process shown in FIG. 2 may be a variation of the techniques described in FIG. 1 through FIG. 7. Although some of the operations presented in FIG. 2 are described as being performed by a "process," the operations are performed by at least one tangible processor or by using one or more physical devices, as described elsewhere herein. The term "process" also may include computer instructions stored on a non-transitory computer readable storage medium which, when executed, create a computer-implemented method.

Method 200 may begin as a computer executes an application launcher 128, the application launcher creating a workspace to support a plurality of applications (operation 202). Next, the process may execute, using the computer, an application manager, the application manager executing as a web service and loading a first data and a second data associated with a first application and a second application, respectively, into the workspace (operation 204). Next, the process may execute, using the computer, a concurrent engineering data service, the concurrent engineering data service capturing data types associated with the first data and the second data and resolving differences in the data types wherein data types comprise at least strings, doubles, and integers (operation 206). Next, the process may execute, using the computer, a data storage and retrieval service, the data storage and retrieval service enforcing integrity of and access rules associated with the first data and the second data (operation 208). Method 200 may terminate thereafter.

The computer executing method 200 may correspond to enterprise computer 102 of system 100, or data processing system 800 of FIG. 8. The computer may cause the first application to process the second data and cause the second application to process the first data. The computer may manage product line engineering data across the multiple products. The computer may launch the first application and the second application with prescribed configurations for each application matching particular products associated with each application.

The computer executing method 200 may publish the second data to the first application and may publish the first data to the second application. The computer may execute a plug-in integration enabling a third application to share a third data with the first data and the second data in the workspace. The computer may provide configurations specific to products from a common set of product line assets.

Figure 3:
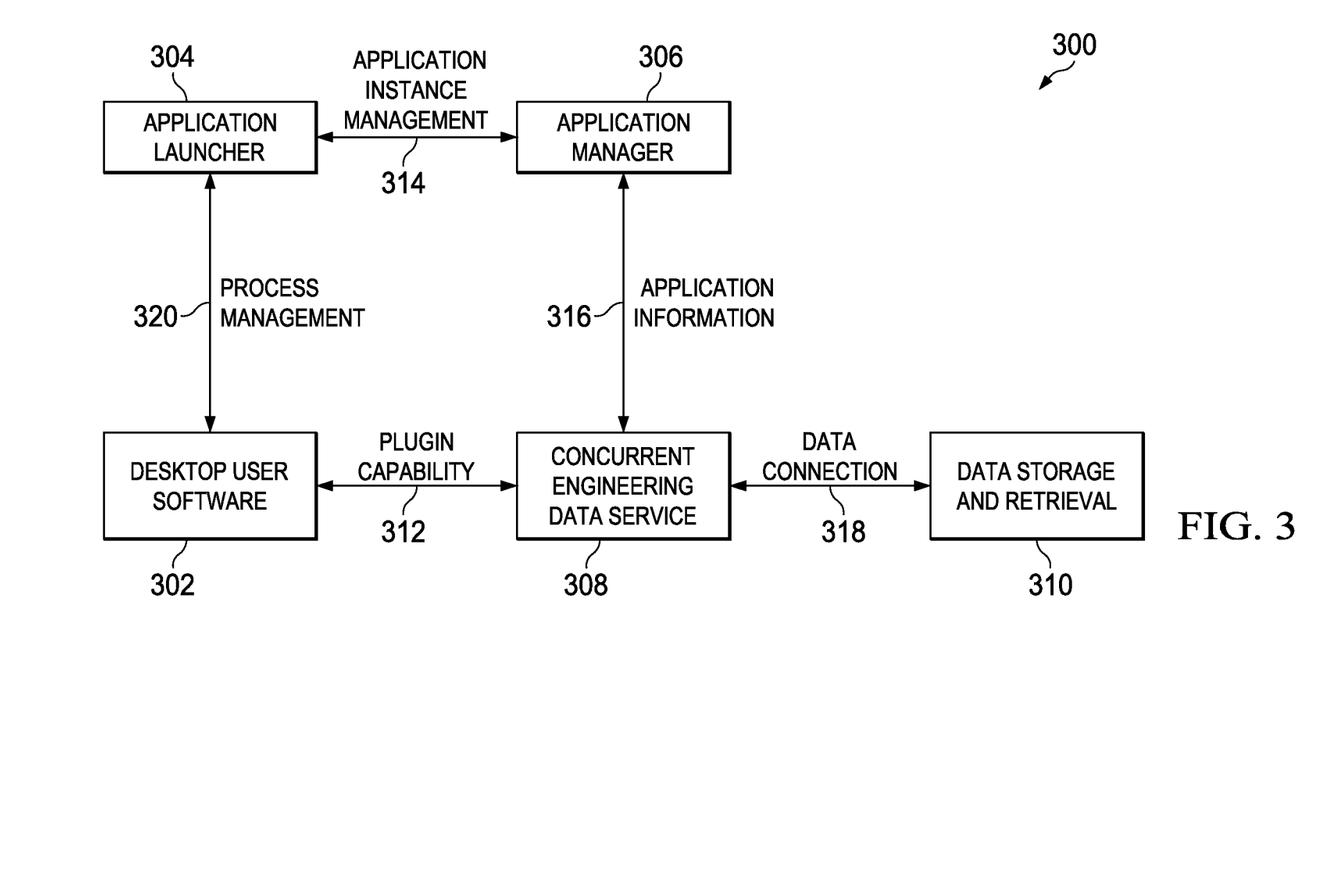
FIG. 3 is a diagram of a workflow in accordance with an illustrative embodiment.

FIG. 3 is a diagram of a workflow in accordance with an illustrative embodiment. FIG. 3 depicts a diagram of a workflow 300 based on some of the components discussed above in the description of system 100. Reference numerals common to those mentioned with respect to FIG. 1 refer back to FIG. 1. Workflow 300 may be implemented using a computer, such as enterprise computer 102 of system 100, or data processing system 800 of FIG. 8.

Workflow 300 begins with desktop user software 302 that is executed by a processor in response to input received from a user of client device 110. In an embodiment, icons or other selectable objects for instantiating application 106 and application 108 may be found in a folder located in client device 110 or elsewhere. Desktop user software 302 may be browser 112 and requester 114 accessible by such icons.

Application launcher 304 may correspond to application launcher 128 of system 100 and launch at least one of application 106 and application 108 in response to receiving user input to initiate of at least one of browser 112 and requester 114. Application manager 306 may correspond to application manager 130 of system 100 and provide a web service-based structure which manages instances of application 106 and application 108. Concurrent engineering data service 308 may correspond to concurrent engineering data service 132 of system 100 and manage collections of configuration information to allow search and retrieval of appropriate data 118, data 120, and data 122.

Data storage and retrieval 310 may provide an item container which can capture information types, encapsulate metadata to provide contextual information, and ensure ownership and rights management on managed data. Data storage and retrieval 310 may correspond to storage device 116 and/or components of storage device 116.

Plug-in capability 312 may provide for direct integrations of some commercial off-the-shelf applications. Commercial off-the-shelf applications may include commonly available spreadsheet applications and drawing applications.

Application instance management 314 may provide communication channels between application launcher 304 and application manager 306 for transmission of various requests and instructions. Application information 316 may provide communication channels between concurrent engineering data service 308 and application manager 306 for transmittal of requests and responses for information retrieval and storage. Data connection 318 may provide a secure connection between an information provider of the web service of application manager 306 and a persistent data store, such as, for example, that provided by data storage and retrieval 310. Process management 320 may provide connectivity between application launcher 304 and desktop user software 302 for communication of state of application 106 and application 108.

Figure 4:
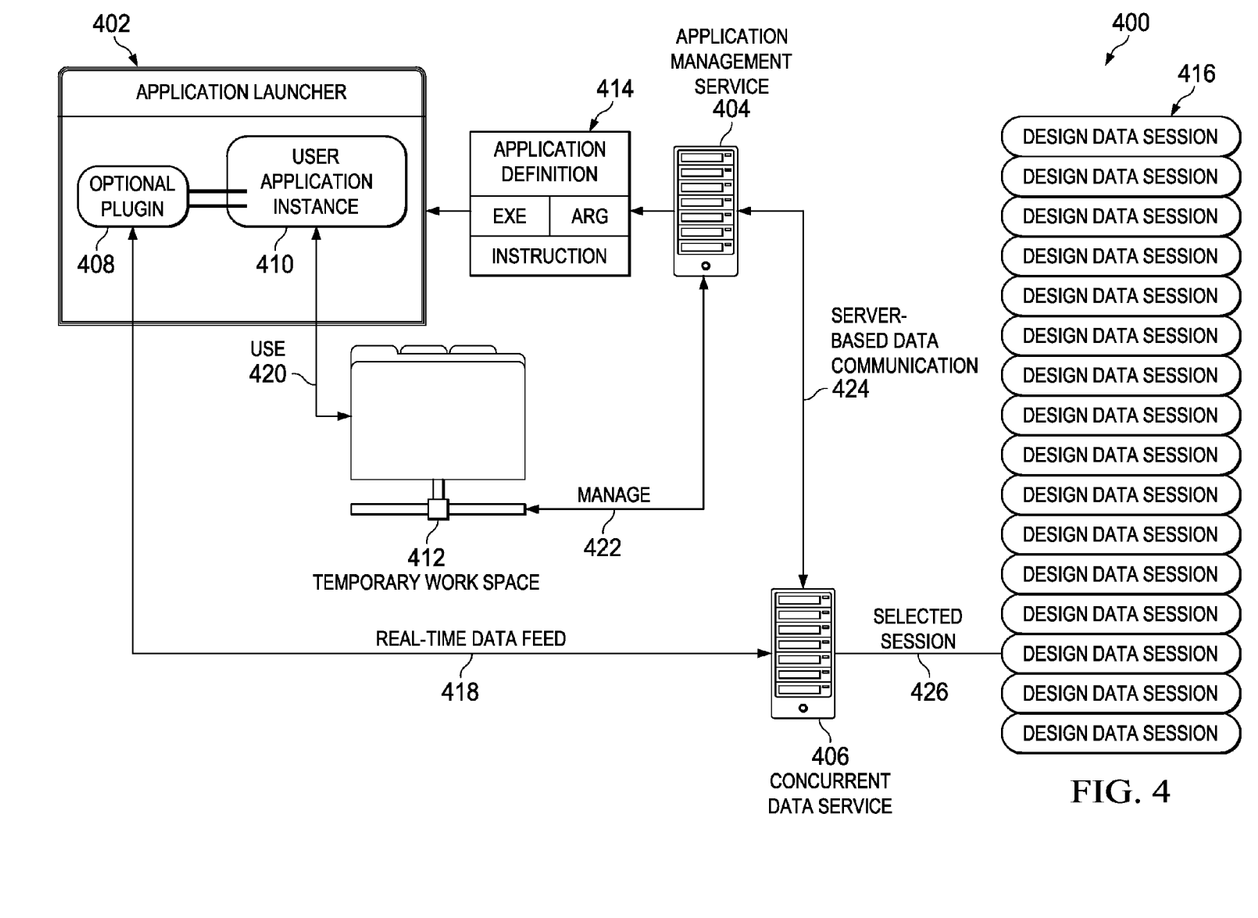
FIG. 4 is a diagram of a system of managing data exchange between tools for multiple products in a product line in accordance with an illustrative embodiment.

FIG. 4 is a diagram of a system of managing data exchange between tools for multiple products in a product line in accordance with an illustrative embodiment. Reference numerals described below that are common to FIG. 1 refer to FIG. 1. System 400 is an alternative graphical representation of workflow 300 depicted in FIG. 3. Relative to FIG. 3, system 400 describes additional features that may show the relationship among application instance management 314 of workflow 300, workspace 124, workspace 126, and application instance management 134 of system 100, temporary workspace 412, and application management service 404 of system 400.

System 400 is based on some of the components discussed above in the description of system 100 as well as additional components and process flows. System 400 includes application launcher 402 that corresponds to application launcher 128 of system 100. System 400 also includes application management service 404 that corresponds to application manager 130 of system 100. System 400 also includes concurrent data service 406 that corresponds to concurrent engineering data service 132 of system 100.

System 400 also may include optional plug-in 408 that corresponds to client device 110. System 400 also may include user application instance 410 that may correspond to at least one of application 106 and application 108. Through application programming interfaces (API), optional plug-in 408 may make calls to concurrent data service 406 for publishing and retrieval of appropriate data 118, data 120, and data 122 within design data session 416. System 400 also may include temporary workspace 412 that corresponds to at least one of workspace 124 and workspace 126 of system 100.

System 400 also may include application definition 414 that includes definitions, executable files, arguments, and instructions for application launcher 402 to use in initializing, instantiating, and launching user application instance 410. Application management service 404 may provide application definition 414 to application launcher 402 for use in launching user application instance 410. System 400 also may include design data session 416 that corresponds to design data session 144 and design data session 146 of system 100.

Real time data feed 418 may take place between concurrent data service 406 and optional plug-in 408 such that client device 110 of system 100 receives data used for user application instance 410. Such data may be sent to temporary workspace 412 for operations. Between user application instance 410 and temporary workspace 412, use 420 of data 118, data 120, and data 122 may take place. Between temporary workspace 412 and application management service 404, components provided herein may manage 422 items of data 118, data 120, and data 122.

Between concurrent data service 406 and application management service 404, server-based data communications 424 may take place. Concurrent data service 406 may send data 118, data 120, and data 122 generated from selected session 426 to design data session 416.

Figure 5:
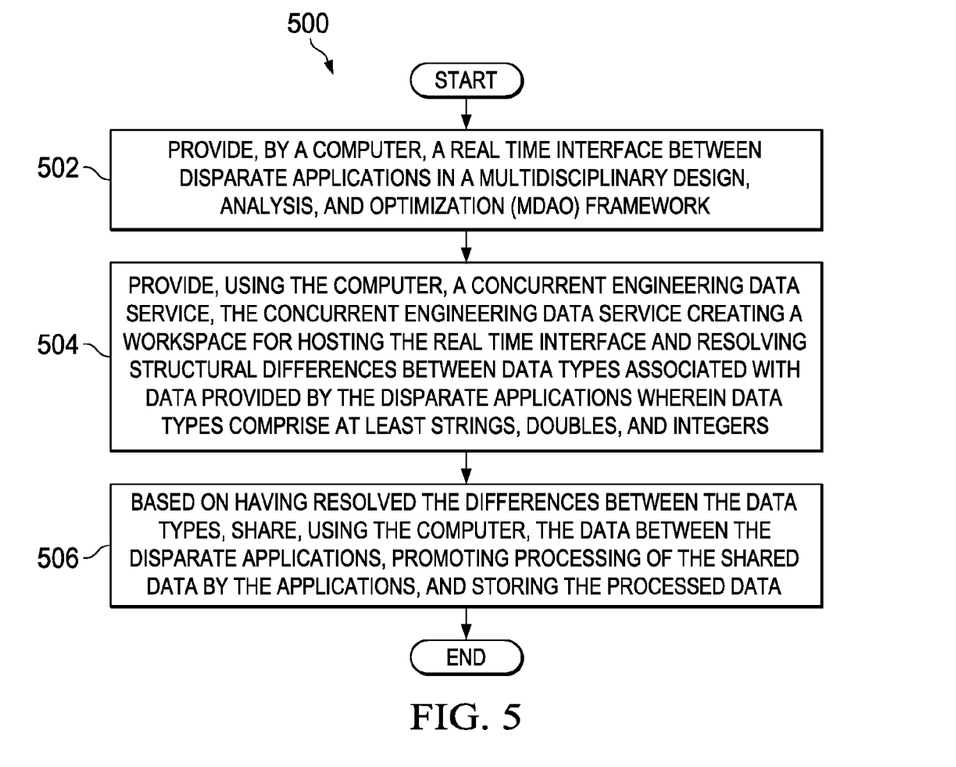
FIG. 5 is a flowchart of a method of managing data exchange between tools for multiple products in a product line in accordance with an illustrative embodiment.

FIG. 5 is a flowchart of a method of managing data exchange between tools for multiple products in a product line in accordance with an illustrative embodiment. Method 500 may be implemented using components provided by system 100 of FIG. 1.

Method 500 may be implemented by a processor, such as processor unit 804 of FIG. 8. Method 500 may be a variation of the techniques described in FIG. 1 through FIG. 8. Although some of the operations presented in FIG. 5 are described as being performed by a "process," the operations are being performed by at least one tangible processor or by using one or more physical devices, as described elsewhere herein. The term "process" also may include computer instructions stored on a non-transitory computer readable storage medium which, when executed, create a computer-implemented method.

The computer as provided by method 500 may correspond to enterprise computer 102 provided by system 100 and may encapsulate metadata to provide contextual parameters about each item of data provided by disparate applications. The computer as provided by method 500 may ensure ownership and rights management on management data. The computer as provided by method 500 may provide a mechanism for collective lock and lifecycle controls of configuration data. The computer as provided by method 500 may activate responding to triggers based on occurrences of predetermined events at a discrete data level. The computer as provided by method 500 may provide concurrent data service as a web service in a service oriented environment.

Method 500 may begin as a computer provides a real time interface between disparate applications in a multidisciplinary design, analysis, and optimization (MDAO) framework (operation 502). Next, the process may provide, using the computer, a concurrent engineering data service, the concurrent engineering data service creating a workspace for hosting the real time interface and resolving structural differences between data types associated with data provided by the disparate applications wherein data types comprise at least strings, doubles, and integers (operation 504). Next, based on having resolved the differences between the data types, the process may share, using the computer, the data between the disparate applications, promoting processing of the shared data by the applications, and storing the processed data (operation 506). Method 500 may terminate thereafter.

Figure 6:
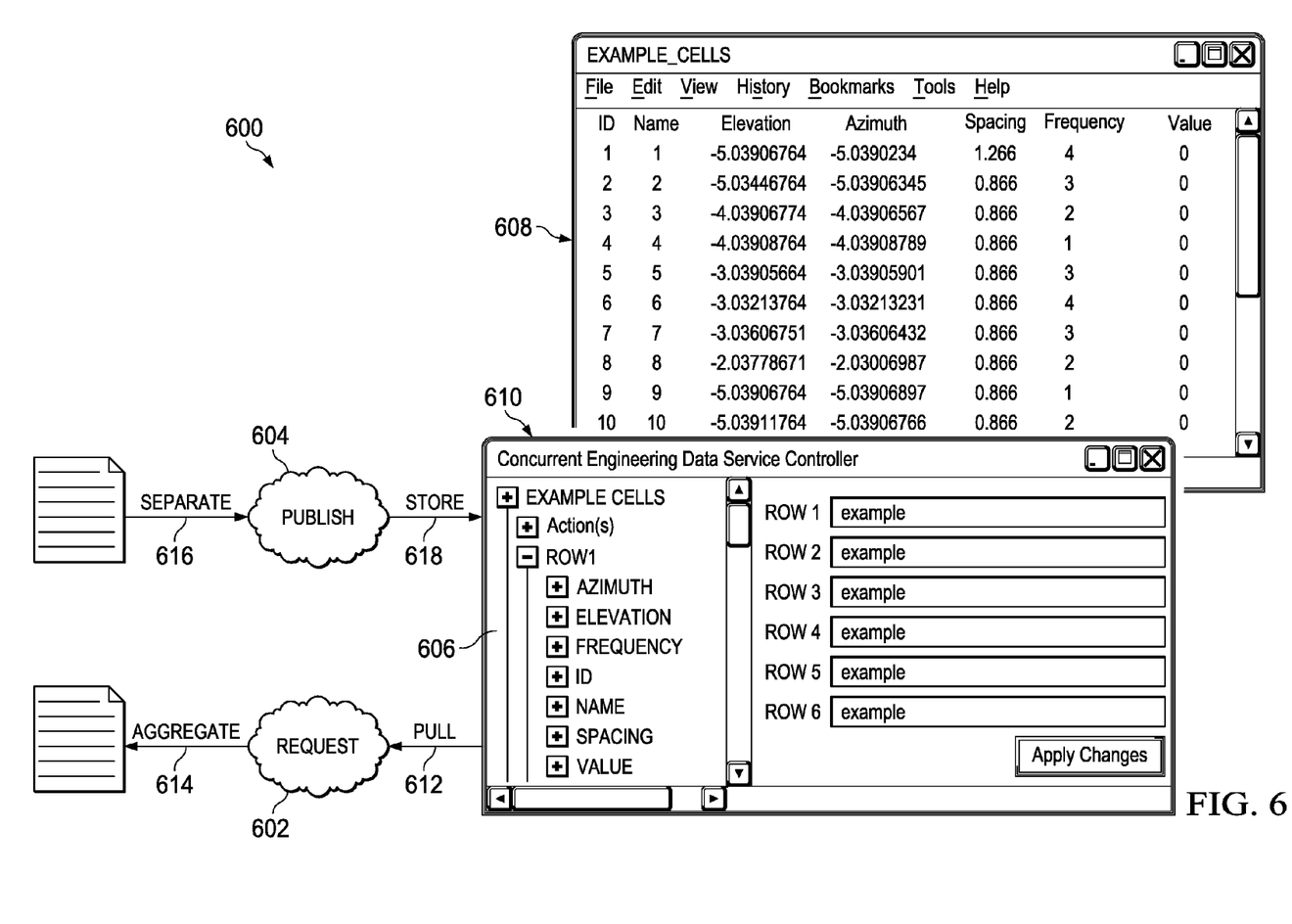
FIG. 6 is a diagram of a workflow of managing data exchange between tools for multiple products in a product line in accordance with an illustrative embodiment.

FIG. 6 is a diagram of a workflow of managing data exchange between tools for multiple products in a product line in accordance with an illustrative embodiment. Reference numerals described below that are common to FIG. 1 refer to FIG. 1.

FIG. 6 depicts workflow 600 of movement of data 118, data 120, and data 122 as provided at least in the discussion of system 100. Data 118, data 120, and data 122 are moved by enterprise application 104 between at least one of application 106 and application 108 and at least one of workspace 124 and workspace 126. FIG. 6 depicts processes of request 602 and publish 604 that may be executed by enterprise application 104.

FIG. 6 also depicts view 606, view 608, and view 610 that are sample screen views generated by enterprise application 104 from at least one of application 106 and application 108. View 606 is a folder view of a file structure from application 106 or application 108. View 608 is a view of a file drawn from the file structure of view 606. View 610 is a view provided by concurrent engineering data service 132 of enterprise application 104 of one of extraction or storing data 118, data 120, and data 122 to one of application 106 and application 108.

Request 602 includes an action of pull 612 of data 118, data 120, and data 122 from application 106 and application 108 and an action of aggregate 614 of data 118, data 120, and data 122 to formats or structures that client device 110 may need for a task. Publish 604 includes actions of separate 616 and store 618 of data 118, data 120, and data 122 processed by enterprise application 104 so that data 118, data 120, and data 122 receive the action of transformation of formats followed by the action of store 618 of data 118, data 120, and data 122 to application 106 and application 108 in their required formats.

Workflow 600 is exemplary only. Many different views are possible, as are different processes that use the action of aggregate 614 data and separate 616 data. For example, FIG. 7 is another example of a workflow of managing data between tools.

Specifically, FIG. 7 is a diagram of a workflow of managing data exchange between tools for multiple products in a product line in accordance with an illustrative embodiment. FIG. 7 provides another view of the workflow of FIG. 6. Reference numerals described below that are common to FIG. 1 refer to FIG. 1. FIG. 7 provides an alternate view of the workflow depicted in FIG. 6 and provided in workflow 600. FIG. 7 depicts workflow 700. Some components of workflow 700 are indexed to components of workflow 600. Processes and component actions of workflow 700 may be similar to or the same as corresponding processes and actions in workflow 600. In this illustrative example, workflow 700 depicts an embodiment of enterprise application 104.

Workflow 700 includes request 702 and component steps pull 712 and aggregate 714 that correspond to request 602 and component steps pull 612 and aggregate 614 of workflow 600. Workflow 700 includes publish 704 and component steps separate 716 and store 718 that correspond to publish 604 and component steps separate 616 and store 618 of workflow 600.

Workflow 700 includes view 706 and view 708 which are provided twice in association with each of the actions of request 702 and store 718. View 706 and view 708 correspond to view 606 and view 608 of workflow 600 wherein view 608 is a file provided by the file structure depicted in view 606. While view 706 and view 708 may appear in FIG. 7 to be the same component, they are inherently associated in the manner of the file of view 608 being a component of the directory structure of view 606.

Workflow 700 also includes view 710 which corresponds to view 610 of workflow 600. Workflow 700 also includes application 720 which may be enterprise application 104 that processes data 118, data 120, and data 122. Application 720 does not have a corresponding object in workflow 600. Application 718 is a representation of a design process or other process that may utilize instances of various applications, such as, for example, application 106 and application 108 of system 100. Data 118, data 120, and data 122 are processed by the components and actions of workflow 700 in the same or similar manner as data 118, data 120, and data 122 may be processed by the components and actions of workflow 600.

The features shown in workflow 600 of FIG. 6 and workflow 700 of FIG. 7 may be further varied. Thus, the examples shown in FIG. 6 and FIG. 7 do not necessarily limit the claimed invention.

FIG. 8 is an illustration of a data processing system, in accordance with an illustrative embodiment. Data processing system 800 in FIG. 8 is an example of a data processing system that may be used to implement the illustrative embodiments, such as system 100 of FIG. 1, or any other module or system or process disclosed herein. Data processing system 800 may be a personal computer, a work station, or an enterprise server, as described above with respect to FIG. 1 through FIG. 7.

In this illustrative example, data processing system 800 includes communications fabric 802, which provides communications between processor unit 804, memory 806, persistent storage 808, communications unit 810, input/output (I/O) unit 812, and display 814.

Processor unit 804 serves to execute instructions for software that may be loaded into memory 806. Processor unit 804 may be used to implement any of the workflows described herein, such as method 200 of FIG. 2, worfklow 300 of FIG. 3, system 400 of FIG. 4, method 500 of FIG. 5, workflow 600 of FIG. 6, and workflow 700 of FIG. 7. Processor unit 804 may be a number of processors, a multi-processor core, or some other type of processor, depending on the particular implementation. A number, as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output (I/O) unit 812 allows for input and output of data with other devices that may be connected to data processing system 800. For example, input/output (I/O) unit 812 may provide a connection for user input through a keyboard, a mouse, and/or some other suitable input device. Further, input/output (I/O) unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for execution by processor unit 804. The processes of the different embodiments may be performed by processor unit 804 using computer implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826. Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800. In some instances, computer readable storage media 824 may not be removable from data processing system 800.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 818 may be omitted because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

As another example, a storage device in data processing system 800 is any hardware apparatus that may store data. Memory 806, persistent storage 808, and computer readable media 820 are examples of storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 806, or a cache, such as found in an interface and memory controller hub that may be present in communications fabric 802.

Data processing system 800 may also include at least one associative memory (not shown). Associative memory may be in communication with communications fabric 802. Associative memory may also be in communication with, or in some illustrative embodiments, be considered part of storage devices 816.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for managing data exchange between tools for multiple products in a product line, reducing access time of a memory, and speeding operation of a processor, the apparatus comprising:
   the processor;
   an application launcher configured to create a workspace to support a plurality of applications,
   wherein the plurality of applications include a first application that uses first data having a first data type and a second application that uses second data having a second data type,
   wherein the first application is disparate from the second application,
   wherein the first data type is structurally disparate from and incompatible with the second data type,
   wherein the first application is used by a first user and the second application is used by a second user different than the first user,
   wherein the application launcher is configured to reduce the access time of the memory by being configured to allow independent work to occur in the first application and the second application before checking into a baseline configuration and by being configured to compare and merge multiple application assets into a single combined configuration, and
   wherein the application launcher is further configured to speed operation of the processor by being configured to launch the first application and the second application in corresponding private, specific workspaces within the workspace;
   an application manager configured to execute as a web service and load the first data and the second into the workspace;
   a concurrent engineering data service configured to capture the first data type and the second data type and resolve structural differences between the first data type and the second data type,
   wherein the first data type and the second data type comprise at least strings, doubles, and integers; and
   a data storage and retrieval service configured to enforce integrity of and access rules associated with the first data and the second data, and to share at least one of the first data and the second data between the first application and the second application.

2. The apparatus of claim 1, wherein the concurrent engineering data service is further configured to cause the first application to process the second data and cause the second application to process the first data.

3. The apparatus of claim 2, wherein the application manager is further configured to publish the second data to the first application and publish the first data to the second application.

4. The apparatus of claim 1, wherein the concurrent engineering data service is further configured to manage product line engineering data across the multiple products.

5. The apparatus of claim 1, wherein the application launcher is further configured to launch the first application and the second application with prescribed configurations for each application matching particular products associated with the each application.

6. The apparatus claim 1, wherein the application manager is further configured to execute a plug-in integration enabling a third application to share a third data with the first data and the second data in the workspace.

7. The apparatus of claim 1, wherein the concurrent engineering data service is further configured to provide configurations specific to products from a common set of product line assets.

8. A computer-implemented method of reducing access time of a memory and speeding operation of a processor by managing data exchange between tools for multiple products in a product line, comprising:
   executing, by a computer, an application launcher, the application launcher creating a workspace to support a plurality of applications, wherein the plurality of applications include a first application that uses first data having a first data type and a second application that uses second data having a second data type, wherein the first application is disparate from the second application, wherein the first data type is structurally disparate from and incompatible with the second data type, wherein the first application is being used by a first user and the second application is being used by a second user different than the first user, wherein the application launcher reduces the access time of the memory by allowing independent work to occur in the first application and the second application before checking into a baseline configuration and by comparing and merging multiple application assets into a single combined configuration, and speeding operation of the processor by launching the first application and the second application in corresponding private, specific workspaces within the workspace;
   executing, using the computer, an application manager, the application manager executing as a web service and loading the first data and the second data into the workspace;
   executing, using the computer, a concurrent data service, the concurrent data service capturing the first data type and the second data type and resolving structural differences between the first data type and the second data type, wherein the first data type and the second data type comprise at least strings, doubles, and integers; and
   executing, using the computer, a data storage and retrieval service, the data storage and retrieval service enforcing integrity of and access rules associated with the first data and the second data, and sharing at least one of the first data and the second data between the first application and the second application.

9. The method of claim 8 further comprising the computer causing the first application to process the second data and causing the second application to process the first data.

10. The method of claim 8, wherein the computer manages product line engineering data across the multiple products.

11. The method of claim 8, wherein the computer launches the first application and the second application with prescribed configurations for each application matching particular products associated with the each application.

12. The method of claim 9, wherein the computer publishes the second data to the first application and publishes the first data to the second application.

13. The method of claim 8 further comprising the computer executing a plug-in integration enabling a third application to share a third data with the first data and the second data in the workspace.

14. The method of claim 8 further comprising the computer providing configurations specific to products from a common set of product line assets.

15. A method of managing data exchange between tools for multiple products in a product line, comprising:
providing, by a computer, a real time interface between disparate applications in a multidisciplinary design, analysis, and optimization (MDAO) framework;
providing, using the computer, a concurrent data service, the concurrent data service creating a workspace for hosting the real time interface, the workspace supporting a plurality of applications, wherein the plurality of applications include a first application that uses first data having a first data type and a second application that uses second data having a second data type, wherein the first application is disparate from the second application, wherein the first data type is structurally disparate from and incompatible with the second data type, wherein the first application is being used by a first user and the second application is being used by a second user different than the first user, wherein the application launcher reduces the access time of the memory by allowing independent work to occur in the first application and the second application before checking into a baseline configuration and by comparing and merging multiple application assets into a single combined configuration, and speeding operation of the processor by launching the first application and the second application in corresponding private, specific workspaces within the workspace, the concurrent data service further resolving structural differences between the first data type and the second data type, and wherein the first data type and the second data type comprise at least strings, doubles, and integers; and
based on having resolved differences between the data types, sharing, using the computer, at least one of the first data and the second data between the first application and the second application.

16. The method of claim 15 further comprising the computer encapsulating metadata to provide contextual parameters about each item of data provided by the disparate applications.

17. The method of claim 15 further comprising the computer ensuring ownership and rights management on management data.

18. The method of claim 15 further comprising the computer providing a mechanism for collective lock and lifecycle controls of configuration data.

19. The method of claim 15 further comprising the computer activating responding to triggers based on occurrences of predetermined events at a discrete data level.

20. The method of claim 15, wherein the computer provides the concurrent data service as a web service in a service oriented environment.

* * * * *